United States Patent Office.

HEINRICH BRAT, OF RUMMELSBURG, GERMANY, ASSIGNOR TO THE ACTIEN-GESELLSCHAFT FÜR ANILIN FABRIKATION, OF BERLIN, GERMANY.

BROMO-TANNIN-GELATIN COMPOUND.

SPECIFICATION forming part of Letters Patent No. 659,204, dated October 9, 1900.

Application filed August 9, 1900. Serial No. 26,373. (No specimens.)

*To all whom it may concern:*

Be it known that I, HEINRICH BRAT, of Rummelsburg, near Berlin, in the Kingdom of Prussia, German Empire, have invented new and useful Improvements in the Organic Bromo Compound; and I do hereby declare that the following is a full, clear, and exact description thereof, which will enable others skilled in the art to which it appertains to make and use the same.

I have found that by precipitating bromo-tannin solutions by means of gelatin a new bromo-tannin-gelatin compound is obtained which, being tasteless and insoluble in the juices of the stomach, is superior to the bromo-tannin compounds described by Böttinger (*Annalen*, 240, p. 330) and has proved to be of extraordinary fitness for medicinal purposes.

In order to prepare this new bromo compound, I proceed as follows: 1.5 kilos of tannic acid are dissolved in 7.5 liters of alcohol, and 1.5 kilos of bromin are added thereto at common temperature. The brown mixture becomes warm and, according as bromin enters into the tannin molecule, loses color slowly. Some water is then added, and, while constantly stirring well, about seventy liters of an aqueous solution containing one and one-half per cent. of gelatin are allowed to run into the liquid until no more precipitate is formed. The product of the reaction is allowed to repose for twenty-four hours. It is then filtered, washed, dried at low temperature, and pulverized. The powder is once more thoroughly washed and dried at a somewhat higher temperature. Thus purified it forms a yellowish-gray powder, free from taste and smell, containing about twenty per cent. of bromin. It is nearly insoluble in water or diluted acids and readily soluble in caustic alkalies to a reddish-brown solution, from which it may be reprecipitated by addition of acids.

The conditions and proportions employed in the above example may be varied within wide limits without altering the nature of my invention, the resulting bromo compound possessing the characteristic properties of being tasteless and insoluble in the juices of the stomach.

Having thus described my invention and in what manner the same is to be performed, what I claim is—

The new organic bromo compound herein described, obtained by precipitating bromo-tannin solutions by means of gelatin solutions; said product containing tannic acid, gelatin and bromin; forming a yellowish-gray powder free from taste and smell, being nearly insoluble in water and diluted acids; being readily soluble in caustic alkalies to a reddish-brown solution; being reprecipitated from the solution obtained by addition of acids; being only little attacked by the action of the juices of the stomach; containing about twenty per cent. of bromin.

In witness whereof I have hereunto signed my name, this 27th day of July, 1900, in the presence of two subscribing witnesses.

HEINRICH BRAT.

Witnesses:
 WOLDEMAR HAUPT,
 HENRY HASPER.